United States Patent [19]

Kataoka

[11] Patent Number: 5,508,825

[45] Date of Patent: Apr. 16, 1996

[54] IMAGE PROCESSING SYSTEM HAVING AUTOMATIC FOCUSING DEVICE

[75] Inventor: Tatsuhito Kataoka, Tokyo, Japan

[73] Assignee: Canon Kabushiki Kaisha, Tokyo, Japan

[21] Appl. No.: 161,445

[22] Filed: Dec. 6, 1993

Related U.S. Application Data

[63] Continuation of Ser. No. 668,206, Mar. 12, 1991, abandoned.

[30] Foreign Application Priority Data

Mar. 15, 1990 [JP] Japan ..................... 2-65697

[51] Int. Cl.$^6$ ..................................................... H04N 1/04
[52] U.S. Cl. ........................... 358/474; 358/406; 348/345
[58] Field of Search .................................. 358/471, 474, 358/489, 406; 355/53; 348/345, 354; 354/402, 407, 408, 406; 250/208.1

[56] References Cited

U.S. PATENT DOCUMENTS

| | | | |
|---|---|---|---|
| 4,459,006 | 7/1984 | Sakai et al. | 354/406 |
| 4,500,188 | 2/1985 | Kitagishi et al. | 354/406 |
| 4,506,925 | 2/1985 | Hanma et al. | 358/227 |
| 4,586,090 | 4/1986 | Wilman et al. | 358/406 |
| 4,660,094 | 4/1987 | Yoshimoto et al. | 358/406 |
| 4,681,419 | 7/1987 | Sakai et al. | 354/402 |
| 4,724,330 | 2/1988 | Tuhro | 358/406 |
| 4,908,656 | 3/1990 | Suwa et al. | 355/53 |
| 4,912,567 | 3/1990 | Nakajima et al. | 358/227 |
| 4,952,965 | 8/1990 | Ishida et al. | 354/403 |
| 4,960,313 | 10/1990 | Yamawaka | 358/489 |
| 5,048,106 | 9/1991 | Nakajima | 358/474 |

*Primary Examiner*—Edward L. Coles, Sr.
*Assistant Examiner*—Thomas L. Stoll
*Attorney, Agent, or Firm*—Fitzpatrick, Cella, Harper & Scinto

[57] ABSTRACT

An image processing device for processing an image formed by a lens on a sensor through an automatic focusing device is arranged to move the lens, in cases where no adequate image is formable on the sensor, to a position determined on the basis of a plurality of lens positions previously obtained with the image formed under the control of the automatic focusing device.

14 Claims, 17 Drawing Sheets

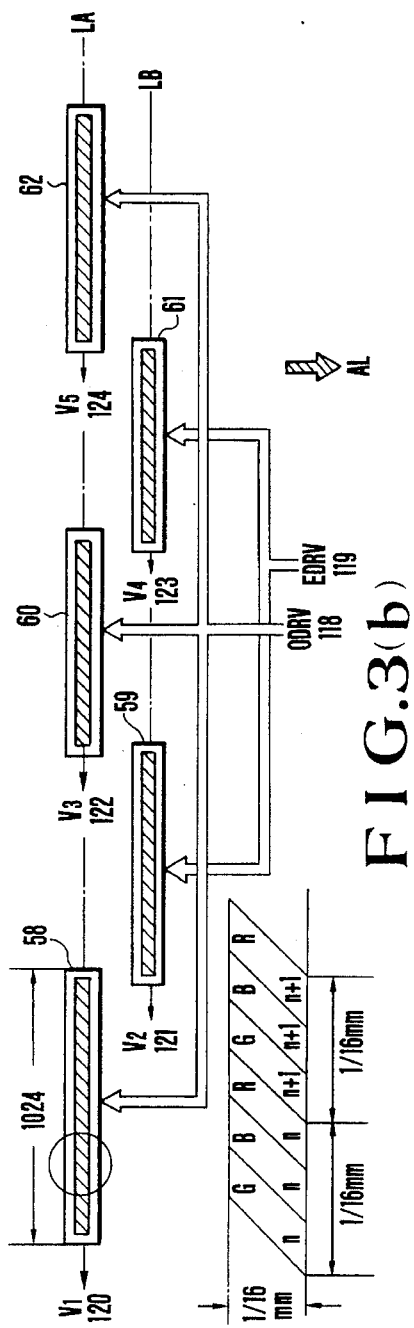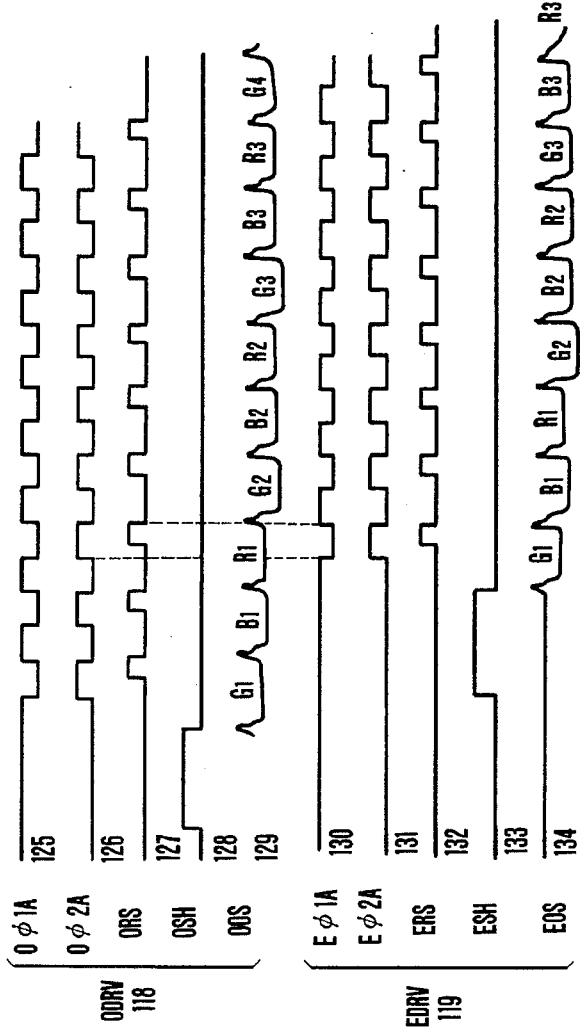

FIG.10(b)

| C2 | C1 | C0 | a | b | c | | |
|---|---|---|---|---|---|---|---|
| 0 | 0 | 0 | 1a | 1b | 1c | Y | ——① |
| 0 | 0 | 1 | 2a | 2b | 2c | M | ——② |
| 0 | 1 | 0 | 3a | 3b | 3c | C | ——③ |
| 0 | 1 | 1 | 4a | 4b | 4c | MONO | ——④ |
| 1 | X | X | X | X | X | BK | ——⑤ |

IMAGE PROCESSING SYSTEM HAVING AUTOMATIC FOCUSING DEVICE

This application is a continuation of application Ser. No. 07/668,206 filed Mar. 12, 1991, now abandoned.

BACKGROUND OF THE INVENTION

1. Field of the Invention

This invention relates to an image reading system for reading an image by scanning a light-transmission original such as a photographic film and more particularly to the automatic focusing arrangement of the image reading system.

2. Description of the Related Art

The known systems of the above-stated kind for reading a light-transmission original such as a 35-mm photographic film include, for example, a drum scanner which is arranged to wind the film on a rotary drum, to rotate the drum and to scan the original by moving the photo-electric conversion part thereof along the drum. In this case, an automatic focusing action is not particularly required.

However, in cases where the light-transmission original, such as the 35-mm photographic film, is to be read at a high degree of resolution, the conventional system has presented the following problems:

In the case of a reversal film (positive film), each frame is in most cases set on a mount. However, the thickness of the mount varies. If the film is handled in a state of being mounted on a mount, the position of the film surface fluctuates in the direction of the optical axis within a range of several mm. Therefore, focus adjustment is necessary for reading out a sharp image.

Further, the film tends to warp irrespective as to whether or not it is mounted on a mount. It is, therefore, difficult to keep the film surface position unvarying. Further, the film position has been greatly affected by the play or uneven degree of precision of the mechanical part of the system.

To solve this problem, it has been practiced in general to stick the film to a glass surface or have the film sandwiched in between two sheets of glass for accurate positioning of the film surface and for preventing it from warping. It is, however, troublesome to take out the film from the mount and to stick the film to the glass. Sandwiching the film in between two sheets of glass brings about Newton rings or tends to have dust sticking either to the glass surface or to the film.

Further, manual focus adjustment for every mount is troublesome, and it not only takes time but also is difficult to accurately perform.

It has been another problem that the focus position for each part of the film surface varies due to the various aberrations of the image forming lens such as curvature of field, astigmatism, chromatic aberration, etc. For example, the focal positions of the color separation images of three colors red (R), green (G) and blue (B) deviate from each other.

Further, while some films have object images formed in a sharply in-focus state including high-frequency components in a large amount, others are not. Automatic focus adjustment cannot be accurately carried out, therefore, if the lens is focused on a film having an image not sharply formed, because, in such a case, it is hardly possible to obtain a high degree of sharpness.

SUMMARY OF THE INVENTION

It is, therefore, a general object of this invention to provide an image reading system which is capable of always accurately carrying out an automatic focusing action by solving the above-stated problems.

Under the above-stated object, it is a more specific object of the invention to provide an image recording system wherein a focus detecting circuit detects the state of focus on an image forming object and the focus is adjusted by driving an image forming lens to a focal position detected by the focus detecting circuit, the system being arranged to determine the focal position of the image forming lens by taking previously determined focal positions into consideration in a case where the result of detection made by the focus detecting circuit is inapposite, and to carry out an image recording action.

It is another object of the invention to provide an image recording system comprising: an image forming lens arranged to form an image of a light-transmission original illuminated by illumination means; an image sensor arranged to photo-electrically convert the image formed by the image forming lens; sharpness detecting means for detecting the degree of sharpness of an image obtained by photo-electric conversion from an image reference area provided for automatic focusing; focus adjusting means for adjusting focus by shifting the position of the image forming lens; maximum value extracting means for extracting a maximum value of the degree of sharpness detected by the sharpness detecting means while the focus adjusting means changes the focal position of the image forming lens; determining means for determining whether the maximum value of the degree of sharpness extracted by the maximum value extracting means has exceeded a predetermined level; and automatic focusing means arranged to adjust the focus, if the result of determination made by the determining means is in the affirmative, to a focal position where the maximum value of the degree of sharpness is obtained and, if the result of determination is in the negative, to a focal position computed on the basis of several focal-position data previously obtained.

The above and other objects and features of the invention will become apparent from the following detailed description of embodiments thereof taken in connection with the accompanying drawings.

BRIEF DESCRIPTION OF THE DRAWINGS

FIGS. 3(a) and 3(b) show a color reading sensor and driving pulses. FIGS. 10(a) and 10(b) show a circuit block provided for color correction and the operation thereof.

DETAILED DESCRIPTION OF THE PREFERRED EMBODIMENTS

Figure 1:
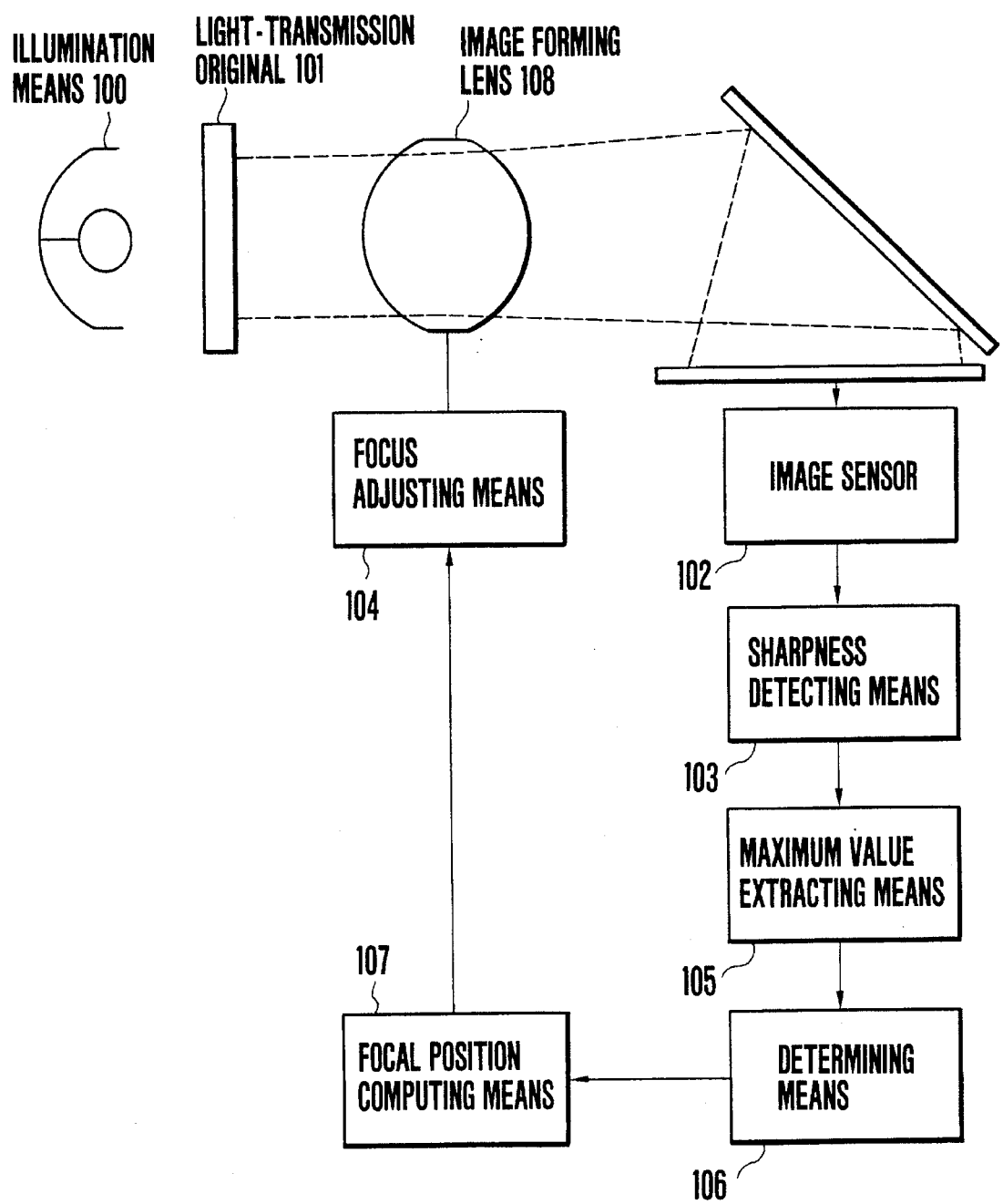
FIG. 1 is a block diagram showing the basic arrangement of an image reading system arranged as an embodiment of this invention.

FIG. 1 shows the basic arrangement of an embodiment of this invention. Referring to FIG. 1, an image forming lens 108 is arranged to form the image of a light-transmission original 101 which is illuminated by an illumination means 100. An image sensor 102 is arranged to photo-electrically convert the image formed by the image forming lens 108. A sharpness detecting means 103 is arranged to detect the degree of sharpness of the image within an image reference area provided for automatic focusing (hereinafter referred to as AF), after the image is photo-electrically converted by the image sensor 102. A focus adjusting means 104 is arranged to adjust the focal position of the image forming lens 108 by moving it. A maximum value extracting means 105 is arranged to extract a maximum value of the degree of sharpness detected by the sharpness detecting means 103 while the focus adjusting means 104 changes the focal position of the image forming lens 108. A determining means 106 is arranged to determine whether the maximum value of the degree of sharpness extracted by the maximum value extracting means 105 has exceeded a predetermined level. A focal position computing means 107 is arranged to set the focal position at a point where the maximum value of the degree of sharpness is obtained if the result of determination made by the determining means 106 is in the affirmative or to set the focal position at a point which is computed in the following manner if the result of determination made by the determining means 106 is in the negative:

(1) The focal position is set at a theoretical value if the AF action has been performed for the first time.

(2) In a case where the AF action has been performed two times or more, the current focal position is determined by carrying out a computing operation on several previous focal positions, taking into consideration the fluctuations in the focal position, etc., which might be caused by a mechanical part.

Figure 2:
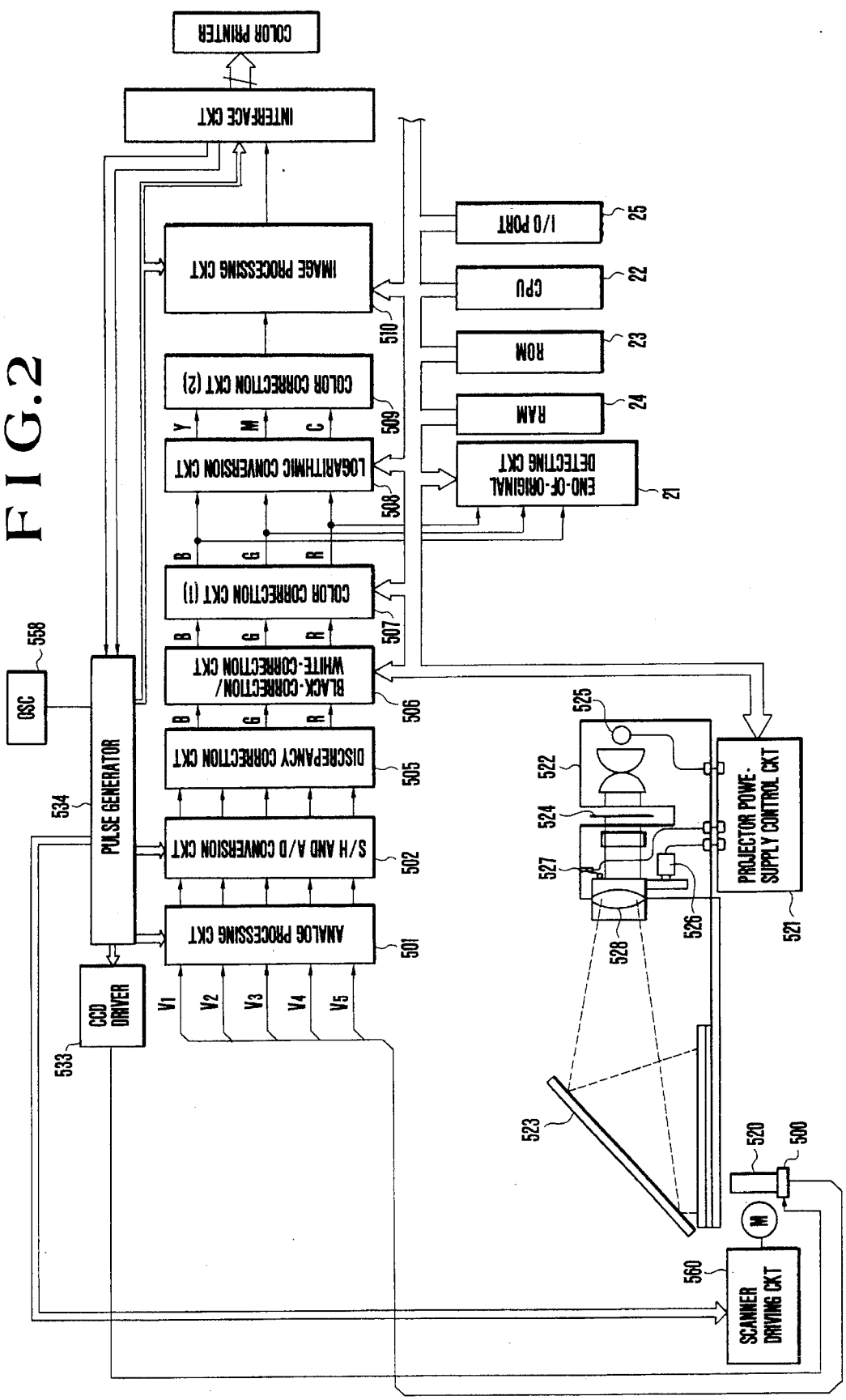
FIG. 2 is a circuit diagram showing the circuit arrangement of the embodiment shown in FIG. 1.

FIG. 2 shows the circuit arrangement of a color image processing system embodying this invention. In the case of the circuit arrangement shown in FIG. 2, the invention is applied to a color image copying apparatus which is arranged as follows: A full color photograph film is illuminated by an illumination light source such as a halogen lamp, a fluorescent lamp, or the like. A projection image thus obtained is sensed by means of a color image sensor such as a CCD (an electric charge storing element) or the like. An analog image signal thus obtained is digitized by an A/D (analog-to-digital) converter, etc. A digital full-color image signal which is thus obtained is processed and supplied to a color printer which is one of varied kinds and is arranged to obtain a color image print from the image signal.

Referring to FIG. 2, a light source (lamp) 525 is used for illuminating the light-transmission original 524, which is a 35-mm photographic film or the like. A focal position adjustment motor 526 is arranged to drive an image forming lens 528 for adjustment of the focal position of the lens. A control circuit 521 is arranged to control the power supply to the focal position adjustment motor 526, the lamp 525, etc. or to control these parts. A home position switch 527 is arranged to determine the home position of the lens 528. A mirror 523 is arranged to polarize the optical path of the image of the original 524. A Selfoc lens 520 is arranged to form the image of the original 524 on a color CCD image sensor 500.

The original 524 is first illuminated by the light-transmission original illuminating lamp 525. A transmission image thus obtained is color-separated and is read by the CCD (image sensor) 500. Each image thus read is supplied to an analog processing circuit 501 to be amplified up to a given level there.

FIGS. 3 (a) and 3 (b) show the color reading sensor and the driving pulses. FIG. 3(a) shows the color reading sensor which is used by this embodiment and is arranged as follows: The sensor includes five sensor chips for reading the image in the main scanning direction thereof. One picture element is set at 62.5 μm (1/16 mm). A total of 1024 picture elements are included in each sensor chip. As shown, each picture element is divided into three for the colors G, B and R in the main scanning direction. Hence, each of the sensor chips consists of a total of 3072 (1024×3=3072) effective picture elements. The chips 58 to 62 are formed on one and the same ceramic substrate. Of these chips, the first, third and fifth sensors, i.e., the chips 58, 60 and 62, are arranged on one and the same line LA. The second and fourth sensors, i.e., the chips 59 and 61, are arranged on a line LB which is away from the line LA at a distance of 250 μm which corresponds to four lines (62.5 μm×4= 250 μm). In reading the original, a scanning action is performed in the direction of arrow AL.

Of these sensor CCDs (chips), the first, third and fifth sensors are driven by a driving pulse group (ODRV) 118 and the second and fourth sensor CCDs by a driving pulse group (EDRV) 119 independently but in synchronism respectively. The pulses Oϕ1A, Oϕ2A and ORS which are included in the driving pulse group (ODRV) 118 and the pulses Eϕ1A, Eϕ2A and ERS which are included in the pulse group (EDRV) 119 are transfer clock pulses for transfer of electric charges obtained within the sensors and electric charge reset pulses. To limit the mutual interference and noises between the row of first, third and fourth sensors and another row of second and fourth sensors, these pulses must be formed in complete synchronism without any jitters. For this purpose, these pulses are formed in accordance with one and the same reference oscillation source OSC 558 (see FIG. 2).

Figure 4A:
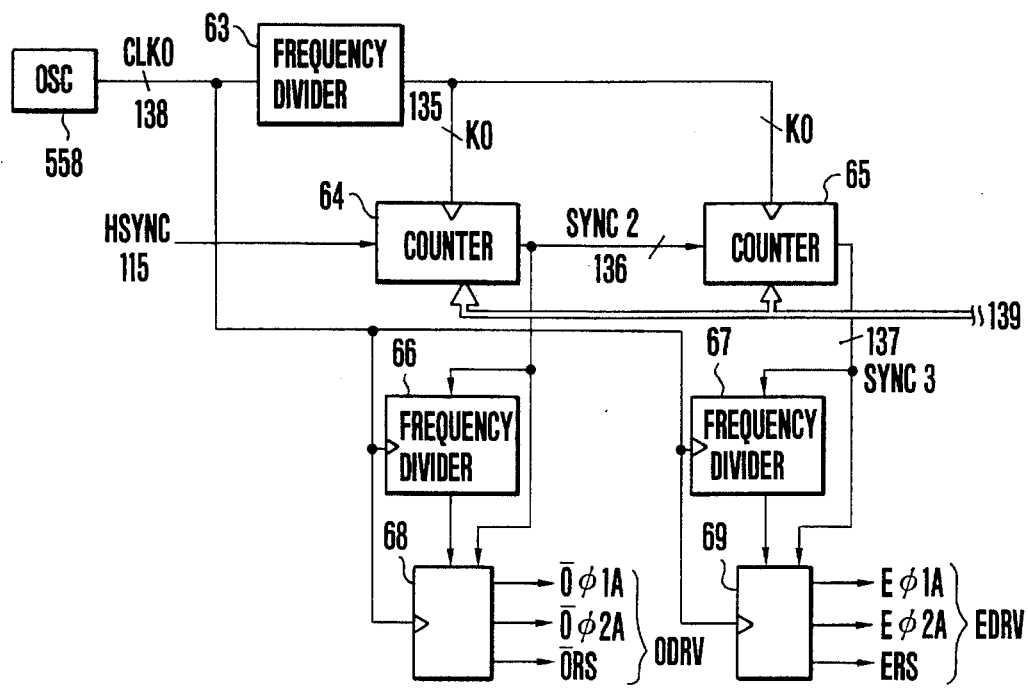
FIGS. 4(a) and 4(b) show a circuit block which forms the driving pulses and the outputs of the circuit block.
Figure 4B:
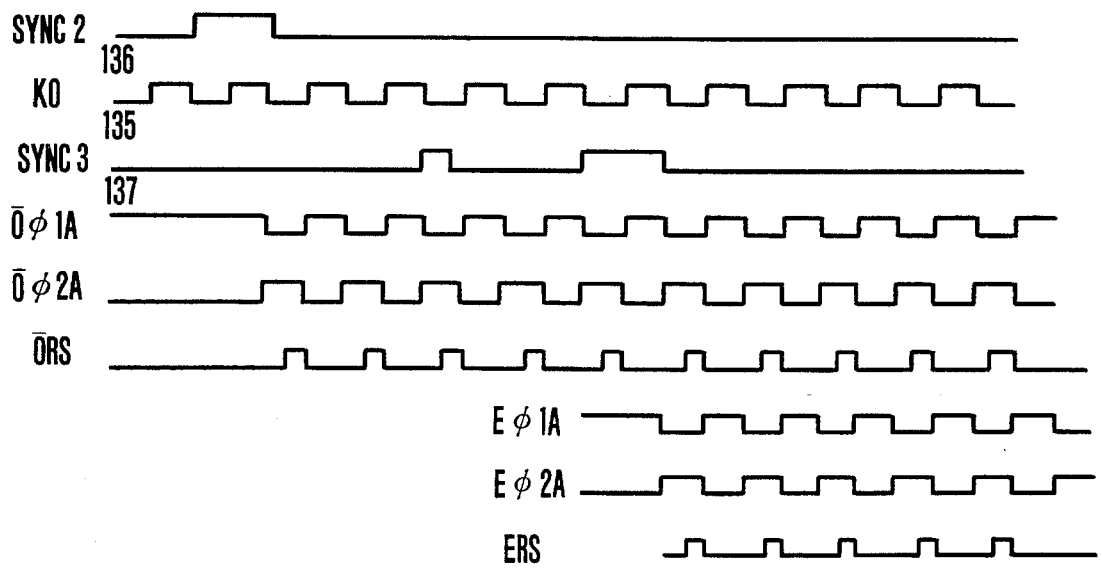

FIG. 4(a) is a circuit diagram showing the block of a pulse generator 534 which is arranged to form the color reading sensor driving pulse groups (ODRV and EDRV) 118 and 119. FIG. 4(b) is a timing chart. Referring to these drawings, a clock signal (KO) 135 which is formed by frequency-dividing an original clock signal CLKO generated by a single reference oscillator (OSC) 558 is used for forming reference signals SYNC2 and SYNC3 which determine the generation timing of the sensor driving pulse groups ODRV and EDRV. The reference signals SYNC2 and SYNC3 are arranged to have their output timing determined in accordance with the setting values of counters 64 and 65 which are preset by a signal line 139 connected to a CPU 22. The reference signals SYN2 and SYNC3 are thus arranged to initialize frequency dividers 66 and 67 and driving pulse forming parts 68 and 69 respectively. In other words, the driving pulse group (ODRV) 118 and the driving pulse group (EDRV) 119 are synchronized without any jitters as they are formed according to frequency-divided clock signals which are generated in complete synchronism with the original clock signal CLKO output from one and the same oscillation source (OSC) 558 on the basis of an HSYNC (horizontal sync.) signal 115. This arrangement effectively prevents any signal disturbance that otherwise results from interference between the sensors.

With the sensor driving pulse groups (ODRV and EDRV) 118 and 119 obtained in synchronism with each other, the pulse group 118 is supplied via a CCD driver 533 to the first, third and fifth sensors 58, 60 and 62. The other pulse group 119 is supplied via the CCD driver 533 to the second and fourth sensors 59 and 61. Video signals V1 to V5 are independently output, in synchronism with the driving pulses, from these sensors 58, 59, 60, 61 and 62 to be processed through different channels as shown in FIG. 2. Analog processing circuit parts 501-1 to 501-5 (not shown) included in the analog processing circuit 501 then amplify these video signals V1 to V5 to a given voltage value. Then, through a coaxial cable, video signals V1, V3 and V5 are then sent to a sample-and-hold (S/H) circuit 502 at the timing of a signal OOS 129 shown in FIG. 3(b) and the video signals V2 and V4 at the timing of a signal EOS 134 also to the S/H circuit 502.

Each of the color image signals which are read and obtained by dividing the original into five and supplied to the S/H circuit 502 is separated into three colors G (green), B (blue) and R (red). Therefore, after the sampling-and-holding process, the original is signal-processed through 15 channels (3×5=15).

The analog color image signals obtained by the sampling-and-holding for the colors R, G and B are digitized by an A/D conversion circuit for each of the channels 1 to 5 and are output respectively to the next stage in parallel.

In the case of this embodiment, as mentioned in the foregoing, the original is read with spacing corresponding to four lines (62.5 μm×4=250 μm) in the sub-scanning direction and with five sensors aligned zigzag for five areas divided in the main scanning direction. Therefore, the reading position of the channels 1, 3 and 5 deviates from that of the channels 2 and 4 which are first scanned. To correctly connect them, therefore, a discrepancy correction circuit 505 which is provided with a memory for a plurality of lines is arranged to correct the discrepancy in the reading position.

Figure 5A:
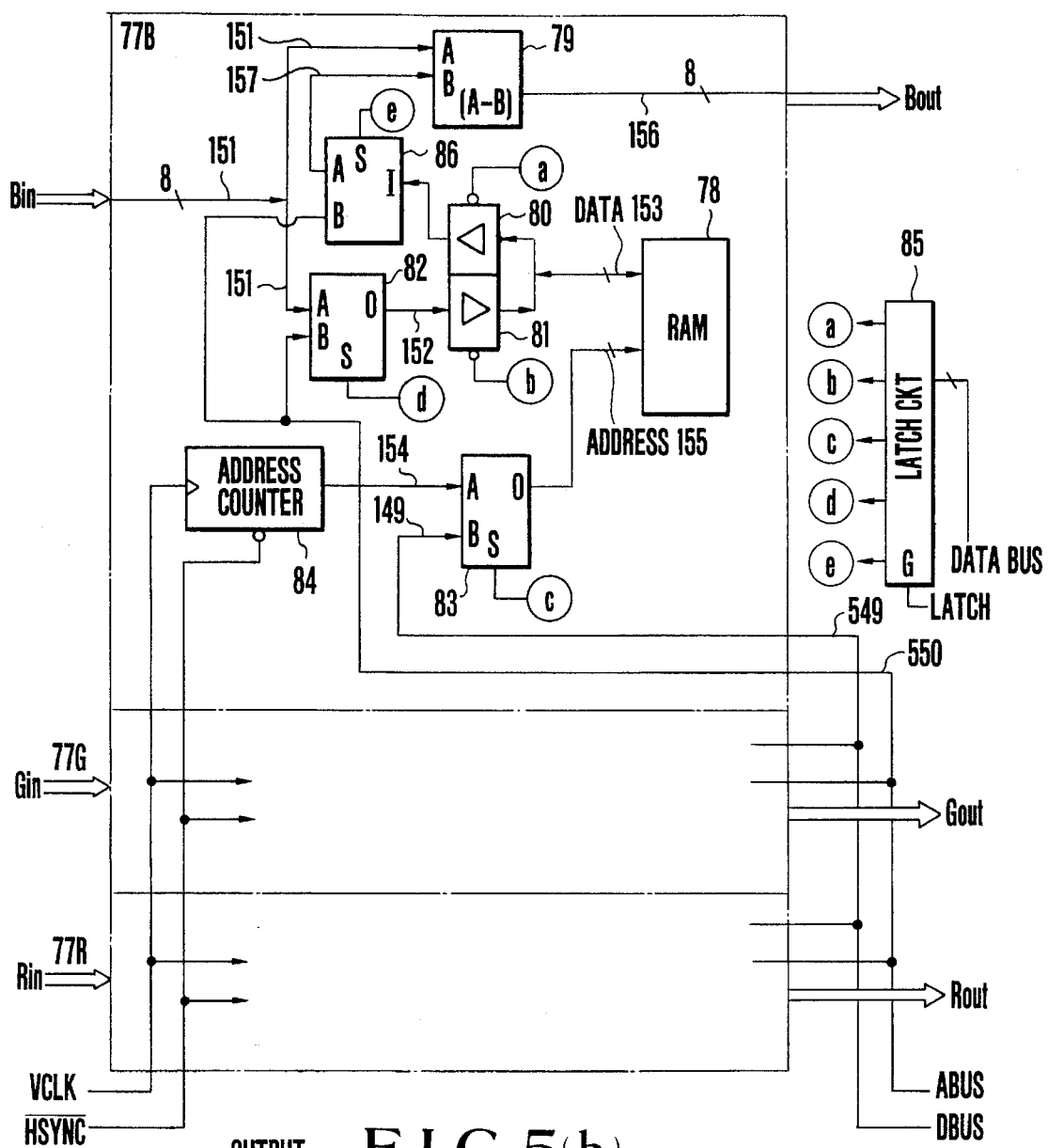
FIGS. 5(a) and 5(b) show a circuit block provided for black correction and the operation thereof.
Figure 5B:
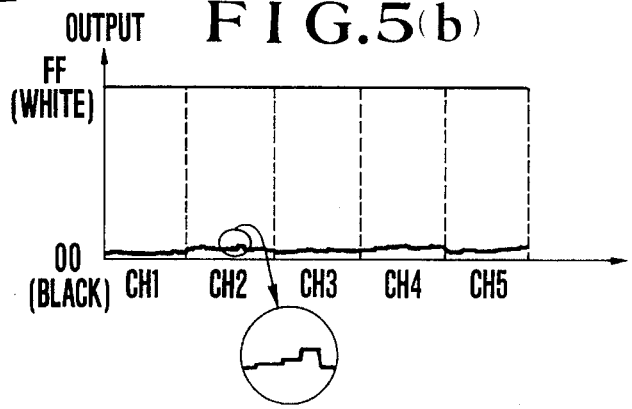

FIG. 5(a) is a block diagram showing a blue signal black level correcting circuit 77B. A black level correcting action is described with reference to FIG. 5 (a) as follows: The unevenness of black level outputs of the channels 1 to 5 between chips and between picture elements increases as the quantity of light incident on the sensors is smaller, as shown in FIG. 5(b). If these outputs are allowed to be output as they are in obtaining an image, stripes and unevenness would appear in the data part of the image. The unevenness in the black part output must be corrected. This circuit is arranged to correct it. In other words, the black level data DK(i) for black correction of, for example, the blue signal input Bin is corrected to make it into Bin(i)−DK(i)=Bout(i). The green signal input Gin and the red signal input Rin are likewise controlled. Further, this control is performed through the I/O ports of the CPU 22. The black correction data DK(i) is readable and writable by having access to a RAM 78.

Referring to FIGS. 6 (a) to 6 (d), the white level (shading) correcting action of a black-correction/white-correction circuit 506 is described as follows: For white level correction, an original scanning unit which includes the Selfoc lens 520 and the CCD image sensor 500 is moved to the middle part of a screen which is not shown but is mounted on a mirror unit 523. Then, the unevenness of the illumination system and the optical systems and that of the sensitivity of the sensor are corrected on the basis of white color data which is an image obtained through a shading correction filter which corresponds to each of negative and positive films.

Figure 6A:
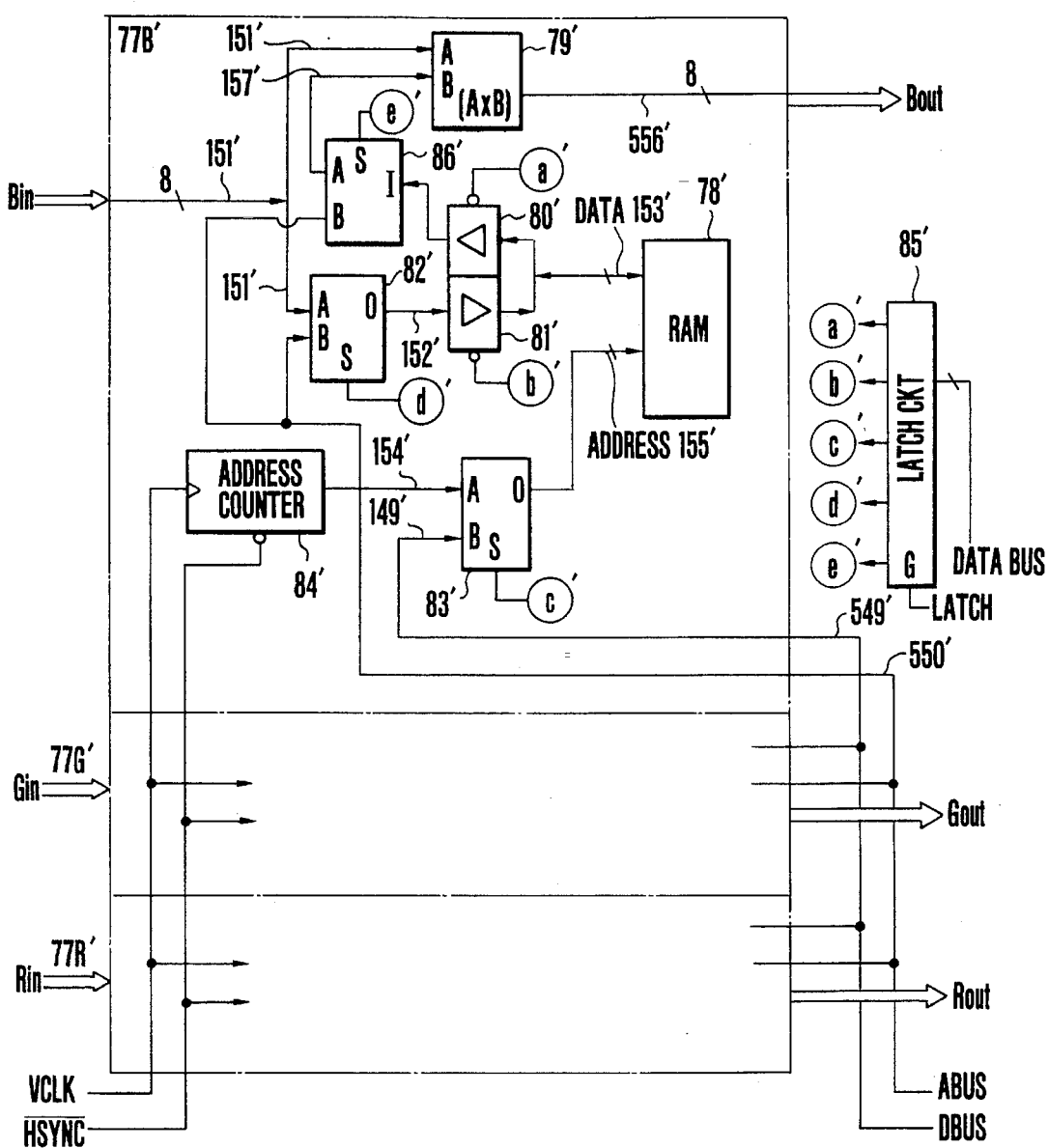
FIGS. 6(a), 6(b), 6(c) and 6(d) show a circuit block provided for white correction and the operation thereof.

What is shown in FIG. 6(a) is a basic circuit arrangement. The basic circuit arrangement is identical with that of FIG. 5(a), except that: While a subtracter 9 is used for correction in the case of the black correction, a multiplier 79' is used for white correction. Therefore, the same parts as those of FIG. 5(a) are omitted from description.

With the CCD 500 for reading the original set in the reading position in the middle part of the screen at the time of the color correction, i.e., before a copying or reading action, a lamp 525 for illuminating the original is lighted up and one line amount of image data for a uniform white level is stored in the RAM 78'. Before this shading correction process, the quantity of light of the lamp 525 is of course set at an apposite value.

Figure 6B:
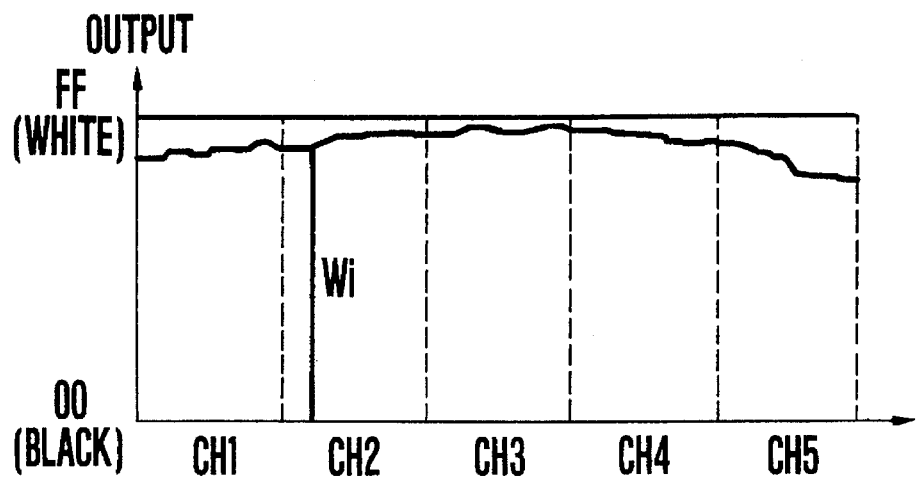
Figure 6C:
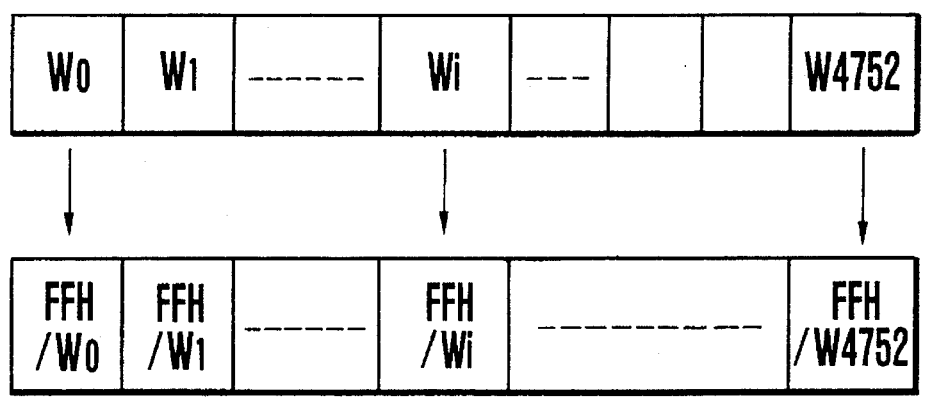
Figure 6D:
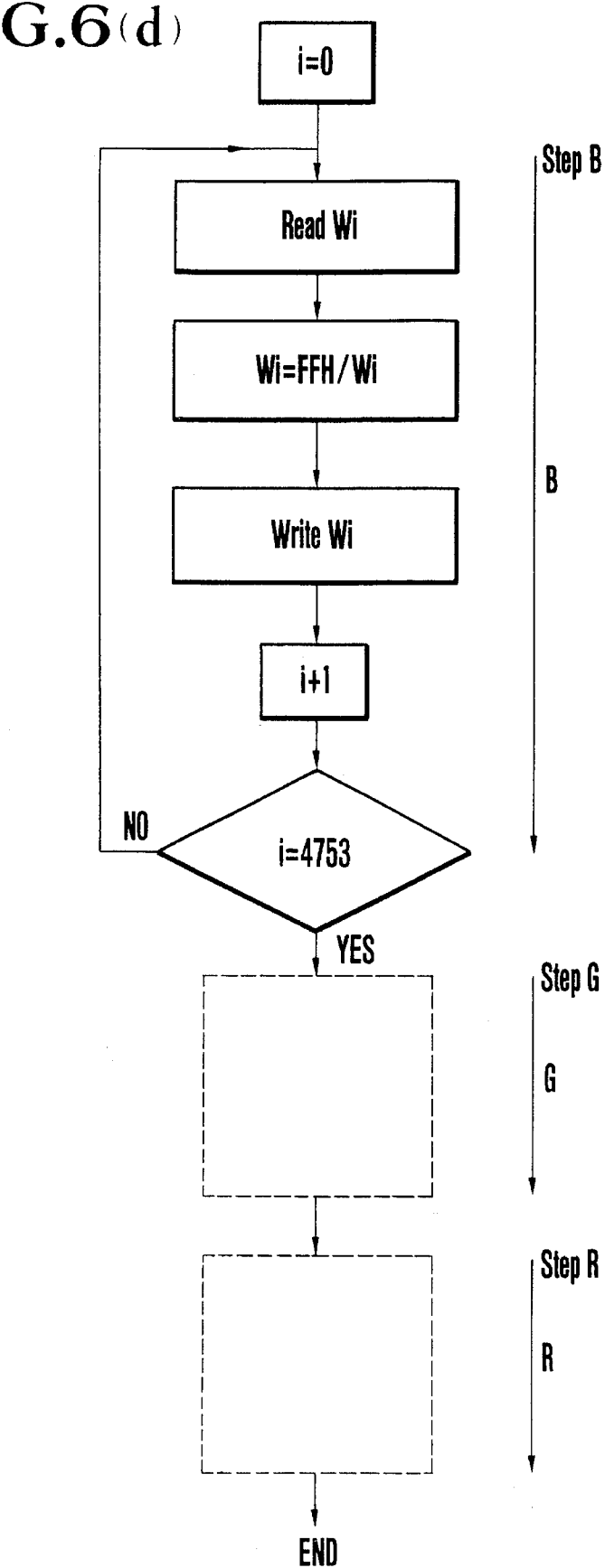

For example, if the transmission image has a width corresponding to the longitudinal length of DIN size A4 in the main scanning direction, there are 16×297 mm= 4752 picture elements, assuming that there are 16 pels per mm. In other words, the capacity of the RAM 78' is at least 4752 bytes. As shown in FIG. 6(b), assuming that the white plate data of the i-th picture element is Wi (i =a number between 1 and 4752), data relative to the white plate is stored in the RAM 78' for each of the picture elements as shown in FIG. 6(c).

Meanwhile, for the data Wi, the normal image reading value Di of the i-th picture element should be corrected to become Do $=Di \times FF_H/$ Wi. Therefore, the CPU 22 is arranged to cause gate circuits 80' and 81' to open for the outputs (a)', (b)', (c)' and (d)' of a latch circuit 85'. Further, selectors 82', 83' and 86' are caused to select the input B. Then, the RAM 78' is brought into a state of being accessible by the CPU 22. Next, in accordance with the steps shown in FIG. 6(d), the CPU 22 replaces data by serially performing computing operations $FF_H/W0$ for the head picture element W0, $FF_H/W1$ for a next picture element W1, - - - . Upon completion of a correcting step B of FIG. 6(d) for the blue component of the color image, a correcting step G is performed for the green component and a step R for the red component one after another in the same manner.

Next, the automatic focal position adjusting algorithm of the embodiment is described as follows with reference to FIG. 11:

Generally the automatic focusing action is performed by detecting and evaluating the degree of in-focus by some suitable means and by controlling, on the basis of the degree of in-focus detected, the position of the distance ring provided on the lens. Compared with an image which is out of focus, an in-focus image has a sharper edge. This means that the latter has a greater amount of high-frequency component of the image signal when the image is read. The amount of high-frequency component of the image signal is used for the evaluation of the degree of in-focus or defocus in general. This method of performing the AF (automatic focusing) action by detecting the state of focus from the image signal is called a blurred degree detecting method in the field of cameras. There are other methods including a method of using the principle of trigonometric measurement, an active method of projecting a spot light or a pattern light and a method of detecting a degree of discrepancy in pattern between images obtained by a plurality of sensors.

In the case of this embodiment, the above-stated blurred degree detecting method can be carried out with a relatively simple mechanical arrangement. The embodiment is thus arranged to use, for example, the image signal of green (G) read out from the CCD line sensor 500 in evaluating the degree of in-focus (or degree of sharpness) by obtaining the degree of sharpness of the image signal within an image reference area set for AF in the middle part of a screen which is not shown but is mounted on the mirror unit 523. It is known that the sharpness degree P can be obtained by a computing formula (b 1) which is as follows:

$$P = \sum_{j=a}^{b} (X_j - X_{j-1}) \quad (1)$$

(wherein "$X_j$" represents the output level of the j-th picture element of the CCD line sensor; and "a" and "b" the picture element number of the second picture element from one end part of the image reference area set for AF and that of the last picture element located at the other end respectively.)

Figure 15:
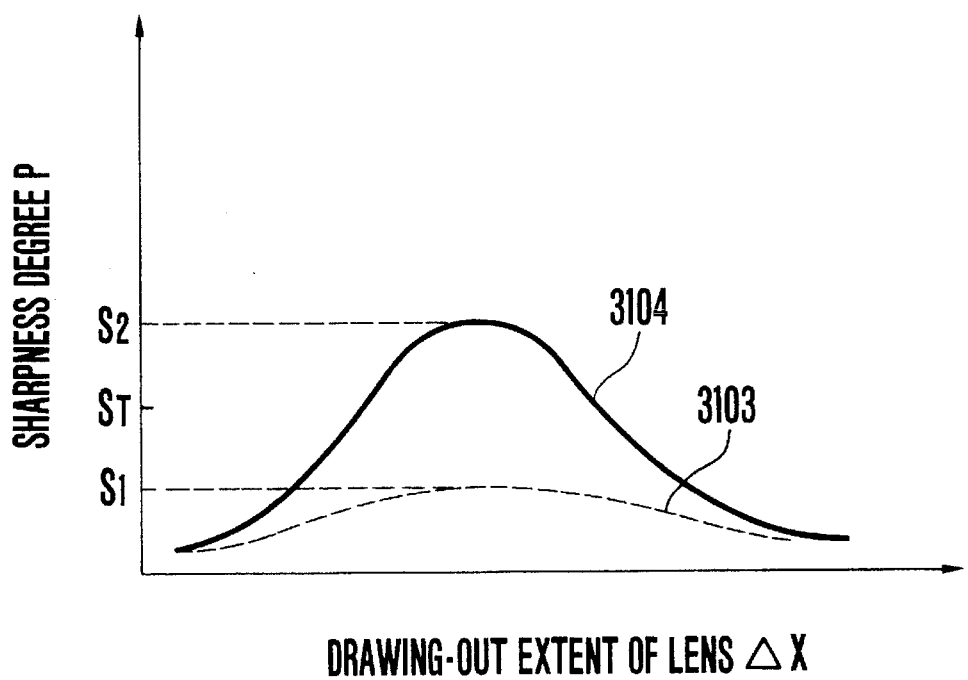
FIG. 15 shows lens drawing-out degrees in relation to sharpness degrees.

In adjusting focus for an image on the basis of the degree of blur, there is a possibility that the high-frequency component of the image signal such as the frequency of the edge part of the image unfortunately exists not much within the AF image reference area of the object original. As represented, for example, by a broken line curve 3103 in FIG. 15, the peak value (maximum value) S1 of the sharpness degree P is sometimes too small for accurate detection of the lens drawing-out degree of an in-focus point.

Figure 11:
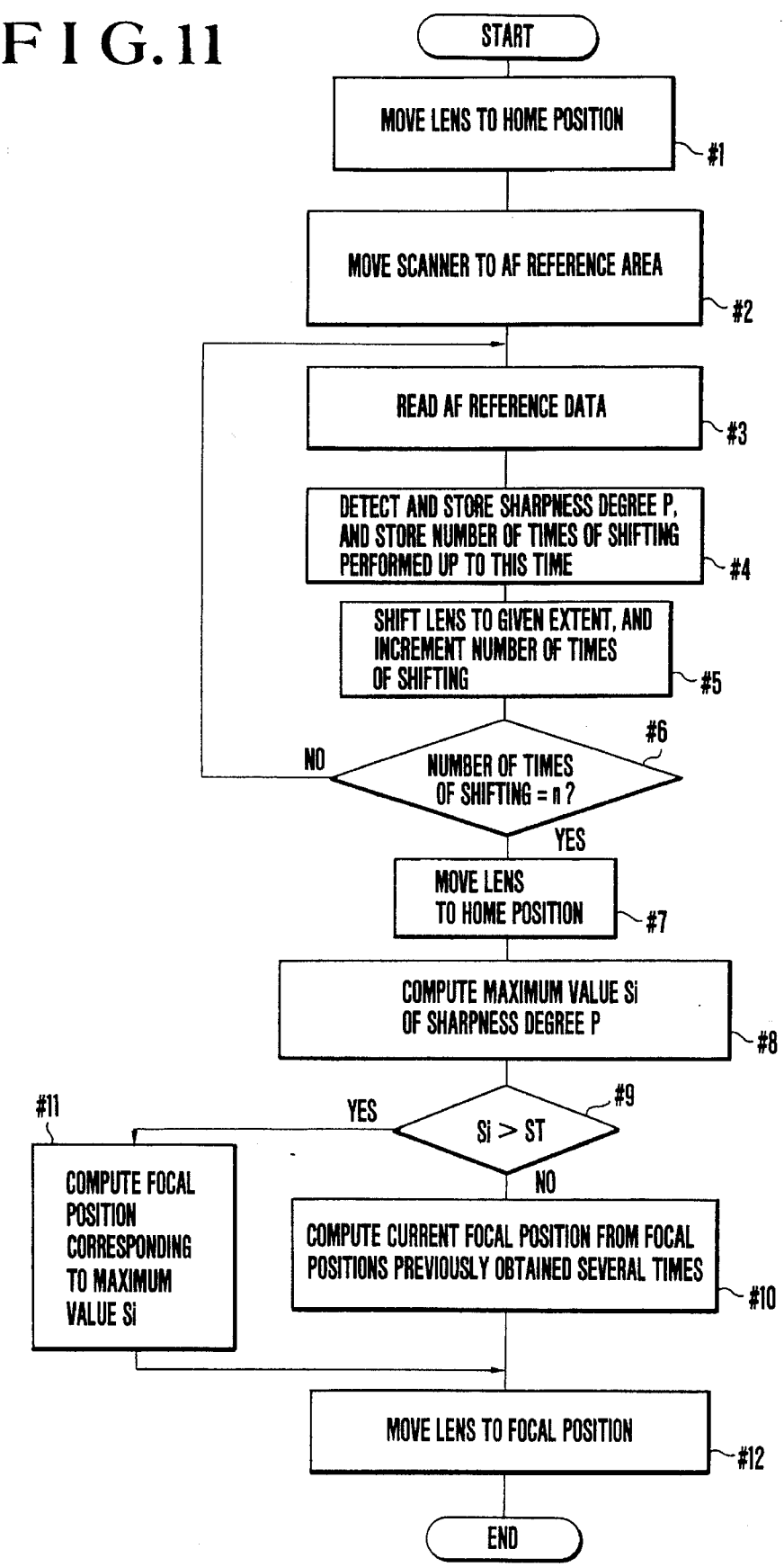
FIG. 11 shows the focus adjustment control algorithm of the embodiment of the invention.

In carrying out the above-stated focus adjustment, the embodiment is arranged to use an algorithm as shown in FIG. 11 which is a flow chart. Referring to FIG. 11, a motor 526 is actuated to move the lens 528 to its home position at a step #1 of the flow chart. Completion of the movement of the lens to the home position is monitored by a home position switch 527. The motor 526 is brought to a stop by the switch 527 upon arrival of the lens at the home position. After that, the flow of operation comes to a step #2 to move the scanner to the AF reference area. At a next step #3, the lamp 525 is lighted up and AF reference data is read. For this purpose, as described in the foregoing, one line amount of data of the CCD image sensor is stored in the RAM 78' which is provided for shading correction. At a step #4: The CPU 22 serially reads out the data and performs a computing operation according to the above-stated formula (1) to obtain the shaprpness degree P. The sharpness degree P thus obtained is then stored in the RAM 24. Further, the current number of times for which the lens has been shifted is stored at the same time. The number of times of shifting is at first set at "0". At a step #5: The motor is started to shift the lens to a given extent and the number of times of shifting of the lens is incremented by one. At a step #6: A check is made to find if the number of times of shifting has reached "n". If not, the flow comes back to the step #3. Further, the lens is assumed to be moved from its home position to the end of a shiftable range when it is shifted "n" times.

The above-stated steps are executed by the CPU 22 every time the lens is shifted to a given extent. When the number of times of shifting is found to have reached "n" at the step #6, the flow comes to a step #7. At the step #7: The lens is moved to its home position.

At a step #8: A maximum value Si is obtained by computation from the sharpness degrees P obtained by the shifting of the lens. At a step #9: A check is made to find if the maximum value Si is larger than a given value ST. In a case where the maximum value Si is found to be extremely small at the step #9, it is sometimes difficult to determine a focal position from the maximum value Si because of the reason mentioned in the foregoing. Therefore, this embodiment is arranged to store data of focal positions previously obtained by repeating the AF action several times according to the flow of operation of FIG. 11. The flow comes from the step #9 to a step #10 in a case where the maximum value Si is found to be small. At the step #10: A focal position is computed and obtained from the previous data stored.

Figure 12:
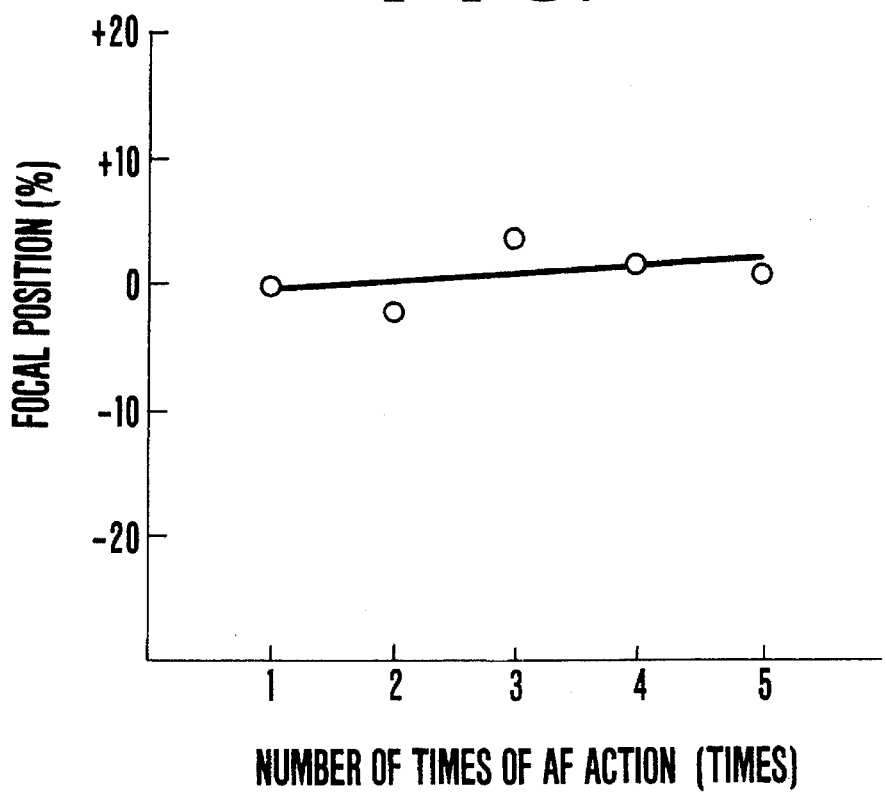
FIG. 12 shows a focusing action in relation to focal positions.

As shown in FIG. 12, the focal position might come to deviate due to various causes such as rattling of a mechanical part, dislocation of the mounted position of the projector body, etc. while the lens is shifted several times. Therefore, at the step #10, the rate of such changes is computed on the basis of the previous focal position data in determining the current focal position. As regards the method for computing the rate of changes, it is most simple to select two points and to find an inclination between the two points. In the case of this embodiment, however, the rate is computed by the method of least square. In another adoptable method, an arithmetic mean of a plurality of focal position data previously obtained is computed and the mean value is employed as the current focal position. At the step #10, the focal position is computed by one of these methods. In cases where the maximum value Si is found to be sufficiently large, the flow comes to a step #11 without recourse to the above-stated process. At steps #11 and #12: the lens is moved to the focal position determined by the maximum value Si obtained at the step #8.

More specifically, at the step #11, the data of the number of times of shifting obtained when the sharpness degree P indicating the maximum value Si is obtained at the step #8 is read out as focal position data. At the step #12: The lens is moved to the focal position by moving it from its home position to an extent corresponding to "(the number of times of shifting)×(the given shifting extent)".

In a case where the flow comes from the step #10 to the step #12, the lens is moved to an extent "(the focal position data obtained at the step #10 (the number-of-times-of-shifting data))×(the given shifting extent)". Further, with a focal position determined at the step #11 according to the flow of FIG. 11, the data thus obtained becomes one of the previous data to be used at the step #10. Therefore, this data is stored to be used at the step #12.

The black level and the white level are corrected, as mentioned above, on the basis of various factors including the black level sensitivity of the image input system, the unevenness in respect of dark current of the CCD, the unevenness of sensitivity among the sensors, the variations in the light quantity of the optical system, the white level sensitivity, etc. The color image data which is thus uniformalized in the main scanning direction and is in proportion to input light quantity is supplied to a logarithmic conversion circuit 508 (FIG. 2) which is arranged to perform a process for adjustment to the spectral luminous efficiency characteristic of the human eye.

Figure 7A:
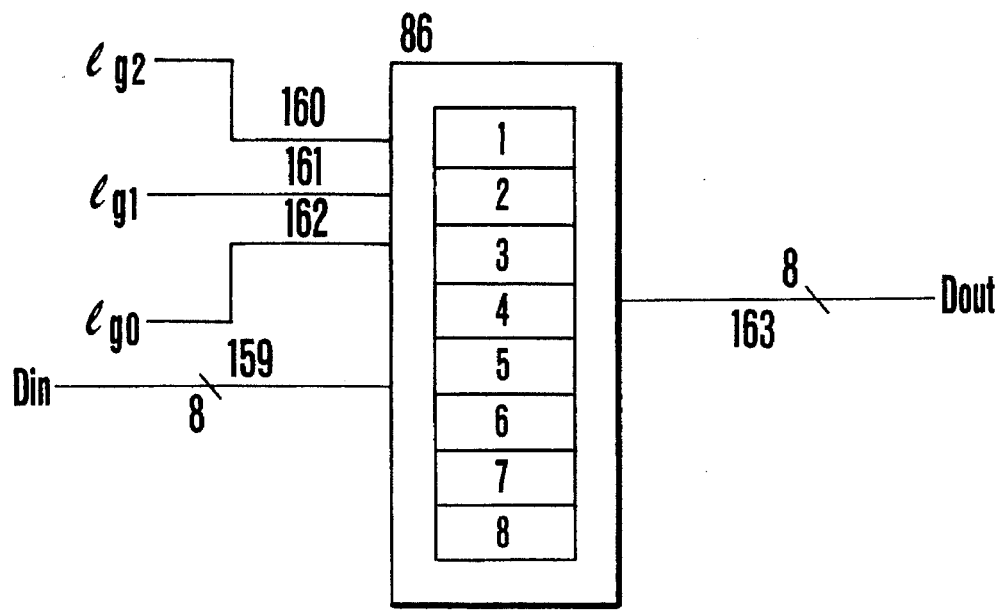
FIGS. 7(a) and 7(b) show a circuit block provided for logarithmic conversion and the operation thereof.
Figure 7B:
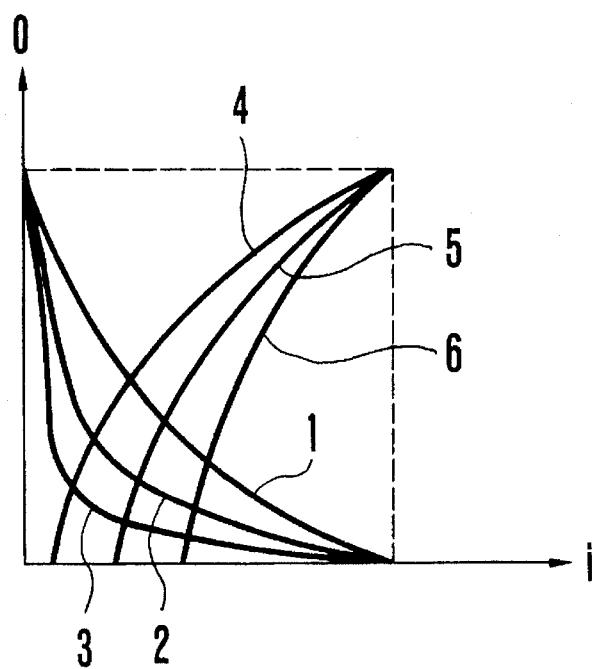

At the logarithmic conversion circuit 508, the color image data is processed to have white=00H and block=FFH. The gamma characteristic of the image supplied to the image reading sensor 500 varies with the light-transmission original and, even if the original is the same, the gamma characteristic varies according to whether the original is a positive film or a negative film and varies with the sensitivity of the film and the condition of exposure to light. Therefore, as shown in FIGS. 7(a) and 7(b), there are provided a plurality of look-up tables (LUT) for logarithmic conversion. The use of these tables is changed from one table over to another according to the purpose. The CPU 22 is arranged to change the selection of the LUT from one over to another according to signal lines lg0, lg1 and lg2 (160, 161 and 162). The data produced for each of the colors B, G and R corresponds to the density value of the output image. For the signals of B (blue), G (green) and R (red), the data corresponds to the amounts of the toners of yellow (Y), magenta (M) and cyan (C). Hence, hereafter, the color image data is assumed to be for Y, M or C.

Further, a color correction circuit (1) 507 is arranged to receive color image data R, B and G; to detect a specific color from the input data; and to replace it with another color. For example, a red part of the original is converted into a blue color or any other color.

Figure 8:
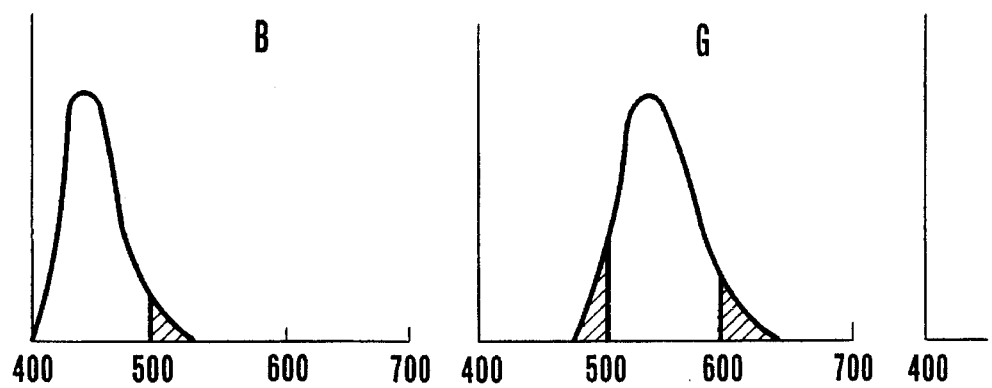
FIG. 8 shows the characteristic of a color separation filter.
Figure 9:
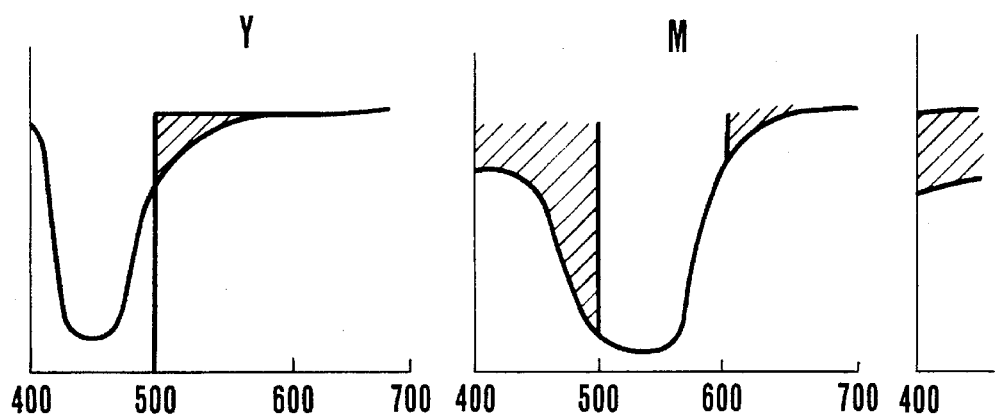
FIG. 9 shows the characteristics of color toners.

The color component image data, i.e., for yellow, magenta and cyan components Y, M and C, obtained by the logarithmic conversion from the image of the original are supplied to a color correction circuit (2) 509. The circuit 509 is arranged to perform color correction as follows: As shown in FIG. 8, the spectral characteristic of a color separation filter which is arranged for each of the picture elements of the color reading sensor includes unnecessary transmission areas as indicated by hatched parts in the drawing. Meanwhile, it is well known that the color toners (for Y, M and C) to be transferred, for example, to a transfer paper has unnecessary absorption components, as shown in FIG. 9. Therefore, the color correction circuit (2) 509 performs a known masking correction process for color component image data Yi, Mi and Ci by carrying out a computing operation for each color in accordance with the following equation of the first degree:

$$\begin{bmatrix} Yo \\ Mo \\ Co \end{bmatrix} = \begin{bmatrix} a_{Y2} - b_{M1} - c_{C1} \\ -a_{Y2} & b_{M2} - c_{C2} \\ -a_{Y3} - b_{M3} & c_{C3} \end{bmatrix} \begin{bmatrix} Yi \\ Mi \\ Ci \end{bmatrix}$$

Figure 10A:
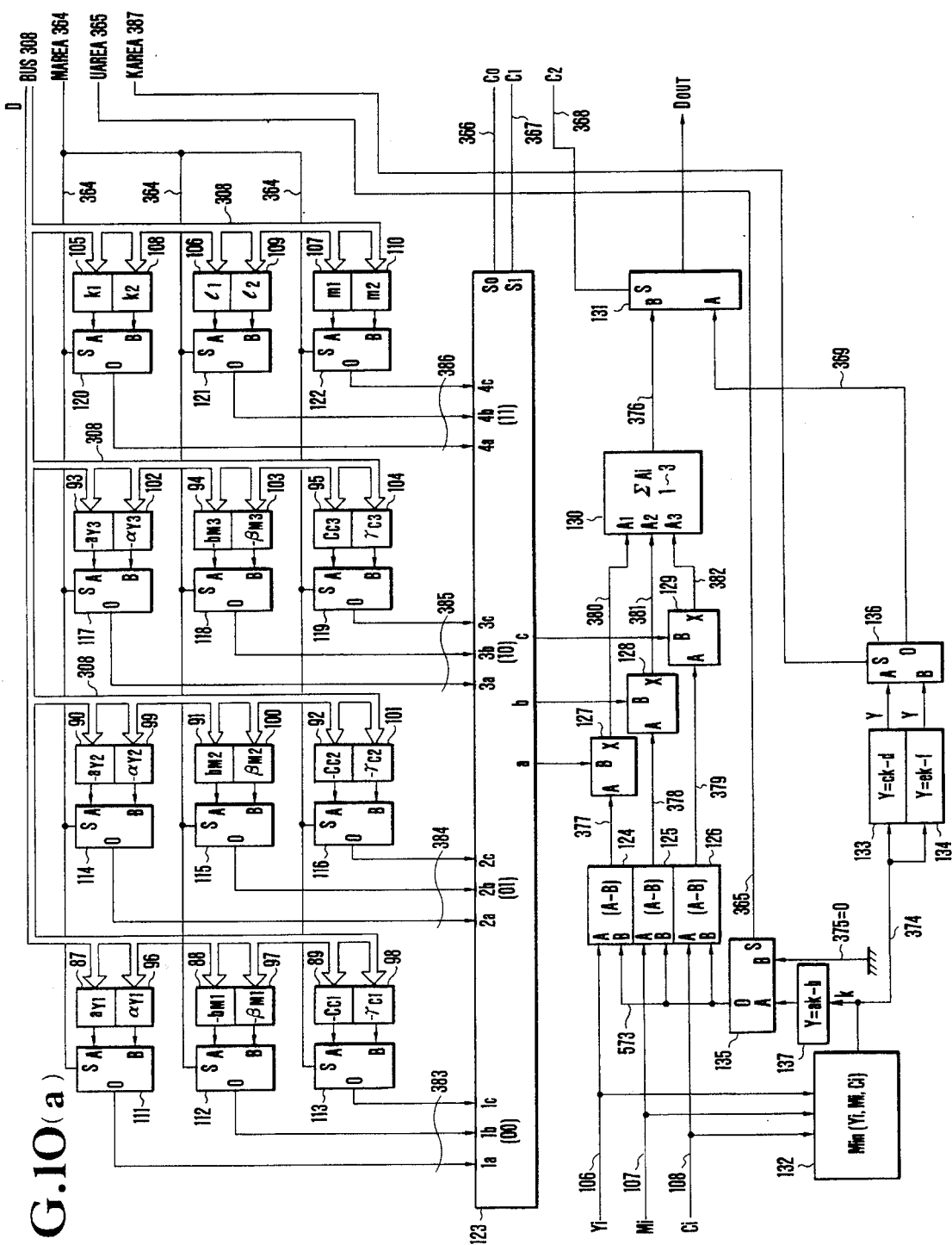

Further, a minimum value Min (Yi, Mi, Ci) of each of the data Yi, Mi and Ci is obtained by computation. The minimum value is regarded as black. After that, a black toner is added (inking) and an under-color removal (UCR) process is carried out in a known manner to reduce each color material according to the black component added. FIG. 10(a) shows the arrangement of the color correction circuit (2) 509 which is arranged to perform the masking, inking and UCR processes. This circuit arrangement has the following features:

(1) The circuit 509 has two masking matrix systems and is capable of quickly changing selection of the masking matrix from one system over to the other by the "I/O" (input-output device) of a single signal line. (2) Inclusion or exclusion of the UCR process is speedily selectable by the "I/O" of a single signal line. (3) There are provided two inking-amount determining circuit systems. Change-over between the two can be quickly effected by means of an "I/O".

Prior to image reading, the use of a first matrix M1 or a second matrix M2 is first determined by means of a bus connected to the CPU 22. In the case of this embodiment, these matrixes M1 and M2 are as follows:

$$M1 = \begin{pmatrix} a_{Y1} - b_{M1} - C_{C1} \\ -a_{Y2} & b_{M2} - C_{C2} \\ -a_{Y3} - b_{M3} & C_{C3} \end{pmatrix}$$

$$M2 = \begin{pmatrix} \alpha_{Y1} - \beta_{M1} - \gamma_{C1} \\ -\alpha_{Y2} & \beta_{M2} - \gamma_{C2} \\ -\alpha_{Y3} - \beta_{M3} & \gamma_{C3} \end{pmatrix}$$

The matrix M1 is set by means of registers 87 to and the matrix M2 by registers 96 to 104 respectively.

Selectors 111 to 122, 135, 131 and 136 are arranged to select an input A when their terminals S are at "1" and another input B when the terminals S are at "0" respectively. Therefore, a change-over signal (MAREA) 364 is produced at "1" in selecting the matrix M1 and at "0" in selecting the other matrix M2.

A selector 123 is arranged to produce outputs a, b and c in accordance with selection signals C0 and C1 (366 and 367) on the basis of a truth table which is arranged as shown in FIG. 10(b). Selection signals C0, C1 and C2 correspond to the color signals to be output. Color signals which have been color-corrected as desired can be obtained for the colors Y, M, C and Bk (black), for example, by producing these signals C2, C1 and C0 at (0, 0, 0), (0, 0, 1), (0, 1, 0) and (1, 0, 0). Further these signals may be produced at (0, 1, 1) as monochrome signals. Assuming that the selection signals C0, C1 and C2 are at "0", "0" and "0" respectively and that the change-over signal MAREA is at "1", the output terminals a, b and c of the selector 123 produce $a_{Y1}$, $-b_{M1}$ and $-c_{C1}$ respectively according to the contents of the registers 87, 88 and 89.

The black component signal 374 which is obtained from the input signals Yi, Mi and Ci and computed as Min (Yi, Mi, Ci)=k is supplied to a converter 137 to undergo a linear transformation process Y=ak–b (wherein a and b are constants) and is supplied to the input terminals B of subtracters 124, 125 and 126 via the selector 135. At these subtracters 124 to 126, the under-color removal computing operation is performed as Y=Yi–(ak–b), M= Mi–(ak–b) and C=Ci–(ak–b). The outputs of these subtracters 124, 125 and 126 are supplied via signal lines 337, 378 and 379 to multipliers 127, 128 and 129 for the masking computation. The selector 135 is controlled by a signal (UAREA) 365. The signal (UAREA) 365 is arranged to permit high-speed change-over between the inclusion and exclusion of the UCR (under-color removal) process by means of an "I/O".

The multipliers 127, 128 and 129 respectively have signals $a_{Y1}$, $-b_{M1}$ and $-c_{C1}$ supplied to their input terminals B and the above-stated signals (Yi–(ak–b), Mi–(ak–b) and Ci–(ak–b))=(Yi, Mi and Ci). As apparent from the drawing, therefore, the output Dout of the circuit gives, under the condition of C2=0 (selection of Y, M or C), Yout=Yi×($a_{Y1}$)+ Mi×($-b_{M1}$)+Ci×($-c_{C1}$). This gives yellow image data which has been subjected to the masking color correction and under-color removal processes. The output Dout likewise gives:

Mout=Yi×($-_{Y2}$)+Mi×($b_{M2}$)+Ci ×($-c_{C2}$)

Cout=Yi×($-a_{Y3}$)+Mi×($-b_{M3}$)+Ci×($c_{C3}$)

The color selection is controlled by the CPU 22 in the order of output to a color printer (C0, C1, C2) in accordance with a table shown in FIG. 10(b). Registers 105 to 107 and 108 to 110 are provided for forming monochrome images. A monochrome image is formed, on the same principle as in the case of the masking color correction mentioned in the foregoing, by carrying out an adding computation to attach weight to color in accordance with a formula: MONO= k1Yi+11 Mi+m1 Ci.

The change-over signal (MAREA) 364 is, as mentioned in the foregoing, for high speed selection between the coefficient matrixes M1 and M2 for masking color correction. The signal (UAREA) 365 is for high speed selection between inclusion and exclusion of the UCR process. A signal (KAREA) 387 is provided for change-over to linear transformation of the black component signal which is produced as the output Dout through the signal line 369 and the selector 131. More specifically, the characteristic of k=Min (Yi, Mi, Ci) is speedily changed to Y=ck–d or to Y=ek–f (c, d, e and f: constant parameters).

The embodiment described above is capable of reproducing the light-transmission original with clearness and fidelity in processing the original.

As mentioned in the foregoing, the embodiment is arranged to determine the focal position of the light-transmission original by the blurred degree detecting method. In accordance with this method, however, some AF error might arise due to some uncertain factor, such as a case where the original has an extremely small amount of high-frequency component. To solve this problem, the embodiment is provided with means for determining the current focal position on the basis of focal position data previously obtained. This enables the embodiment to compute and obtain apposite focal position for any light-transmission (or film) original.

Figure 13A:
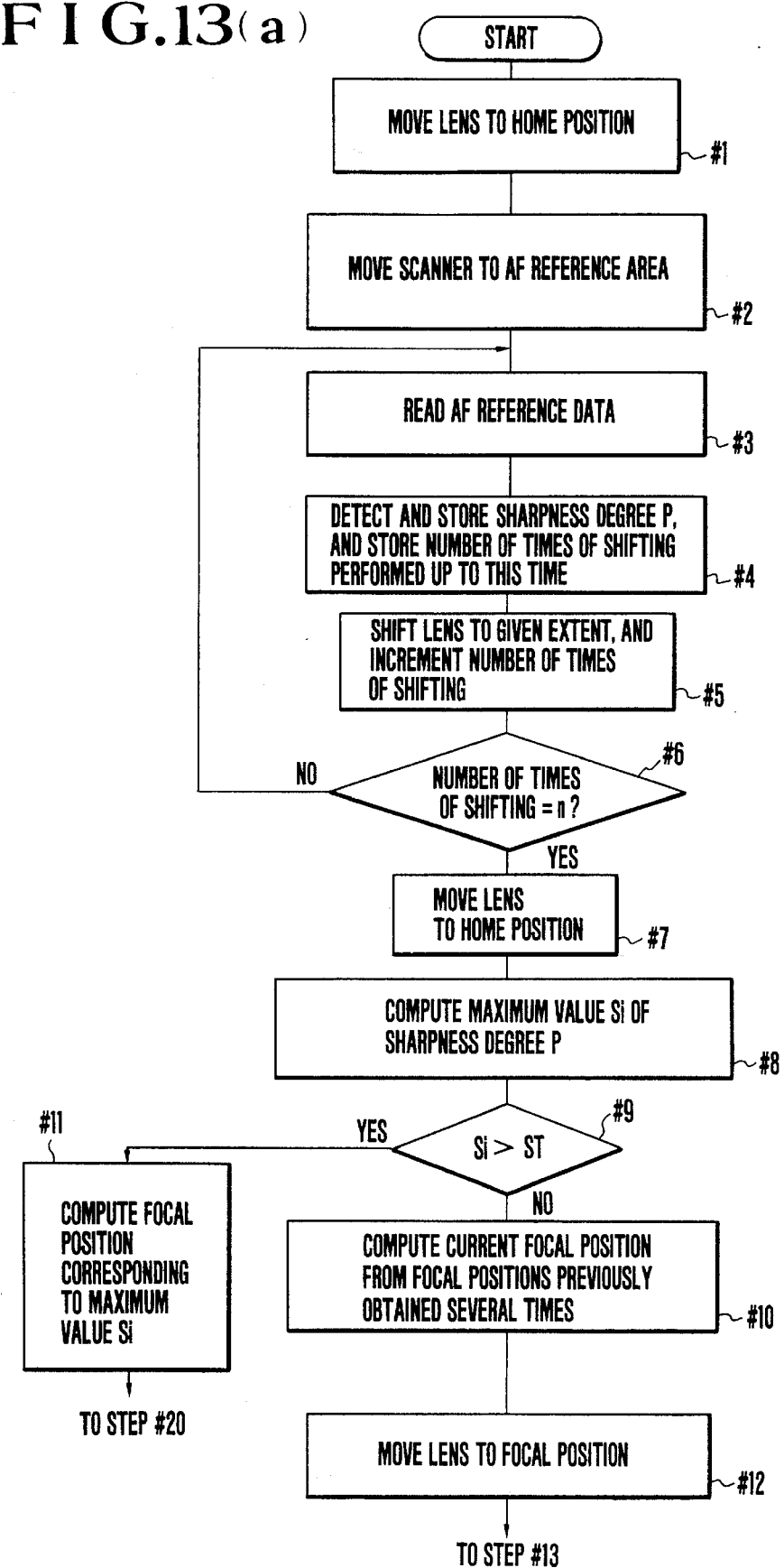
FIGS. 13(a) and 13(b) show the control algorithm of another embodiment.
Figure 13B:
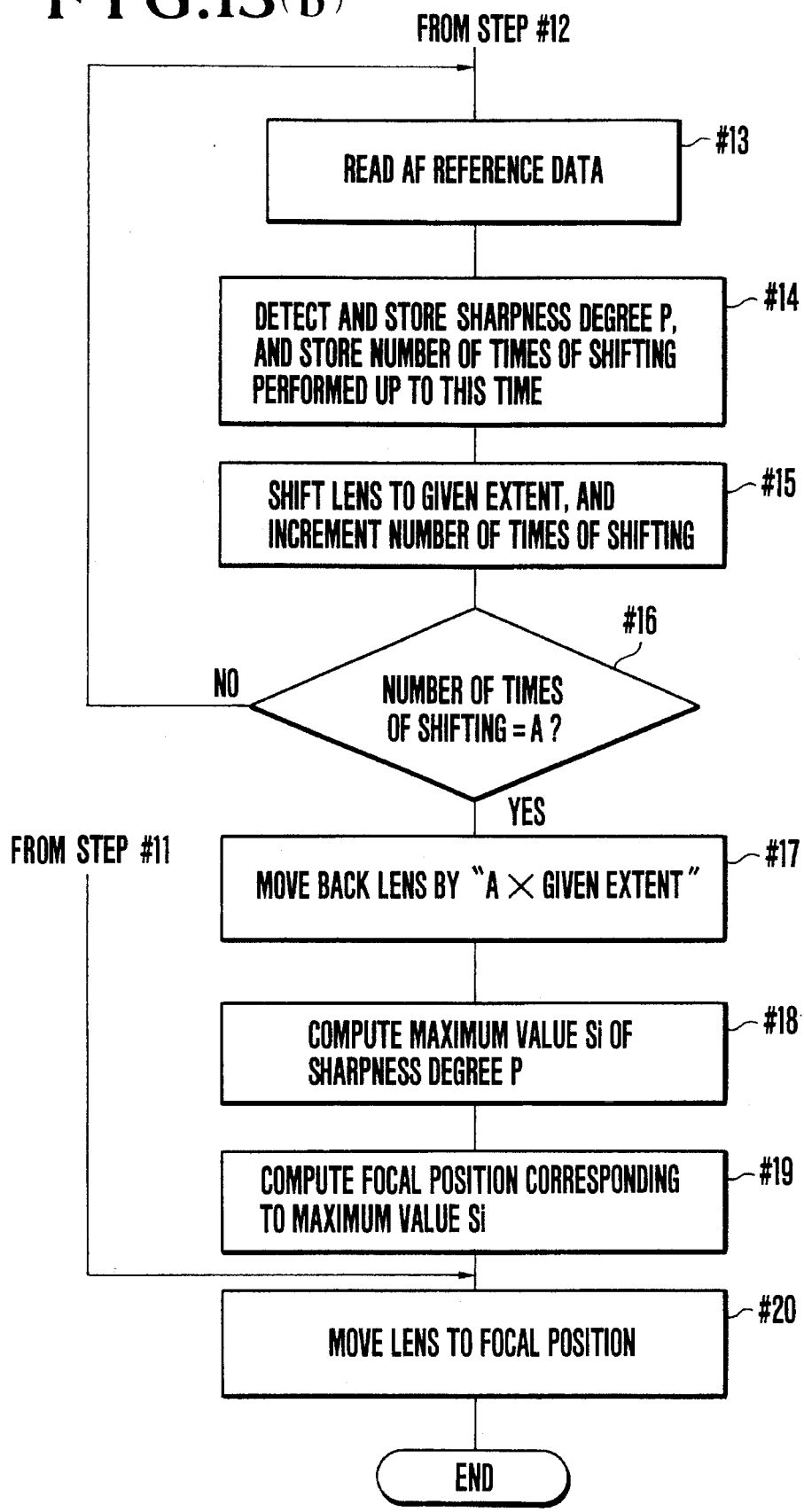

A second embodiment of this invention is described with reference to FIGS. 13(a) and 13(b) as follows: As shown in FIG. 1, the original 101 which is projected by the illumination means 100 is photo-electrically converted by the image sensor 102. The sharpness degree P is computed by the sharpness detecting means 103. The maximum value Si of the sharpness is then extracted from many sharpness degree values P thus obtained. If the maximum value Si is found to be smaller than a predetermined threshold value ST, i.e., if the edge component of the image or the like is extremely small, the current focal position is computed and obtained from several focal positions previously obtained in the same manner as the steps #1 to #10 of FIG. 11 as described in the foregoing. In the case of the second embodiment, however, the subsequent steps are executed in a manner as described below:

It is probable that, in some unusual cases where the film is curved or a mount to which the film is fixedly attached is deformed, for example, the focal position of the original image deviates much from its theoretical position. In such a case, it is difficult to compute the current focal position solely from the previous focal positions. To solve this problem, the algorithm of the second embodiment is arranged not only to move the lens position by predicting the current focal position from the previous focal position data at the steps #10 and #12 but also to further look up the neighborhood of the predicted point to more finely determine the current focal position.

In other words, the flow of operation of the second embodiment is executed as follows: After the focal position is computed at the step #10, the flow comes to the step #12 to move the lens to the position computed. After that, the flow comes to a step #13. At the step #13: A lens driving motor 526 is finely operated to further move the lens within a given narrow range from the focal-position obtained at the step #10. Then, AF reference data is read for each lens position thus obtained. At a step #14: The sharpness degrees P obtained at these new lens positions are detected. At a step #18: The maximum value Si of the sharpness degrees P is computed. At steps #19 and #20: The lens is moved to a focal position corresponding to the maximum value Si.

More specifically, the data is read and obtained at the step #13. At the step #14, the current sharpness P and the number of times of shifting of lens position are stored. In the first round of the flow, the number of times of shifting is stored as zero. At a step #15, the lens is shifted to a given extent and the number of times of shifting is incremented. Compared with the lens shifting extent of the step #5, the lens is shifted to a much shorter extent at the step #15. At a step #16, a check is made to find if the counted value of the number of times of shifting has reached a given value A. If not, the flow comes back to the step #13 to repeat the above-stated actions. The sharpness degree P is thus detected while the lens is shifted to a very short extent at a time. When the number of times of shifting is found to have reached the given value A at the step #16, the flow comes to a step #17 to move the lens back to an extent corresponding to "A×the given extent". By this, the lens is moved to the position first obtained at the step #13. Then, at steps #18, #19 and #20: The data of the number of times of shifting which shows the maximum value Si among the sharpness degrees P is obtained by the above-stated shifting. The lens is moved to an extent corresponding of "the number-of-times-of-shifting data X the given extent" up to the position where the maximum value Si is obtained. This arrangement enables the second embodiment to correct the current focal position predicted from previous focal position data, even if it happens to deviate from the actual focal position. The arrangement not only effectively copes with a curved state of film but also ensures an accurate AF action.

Figure 14:
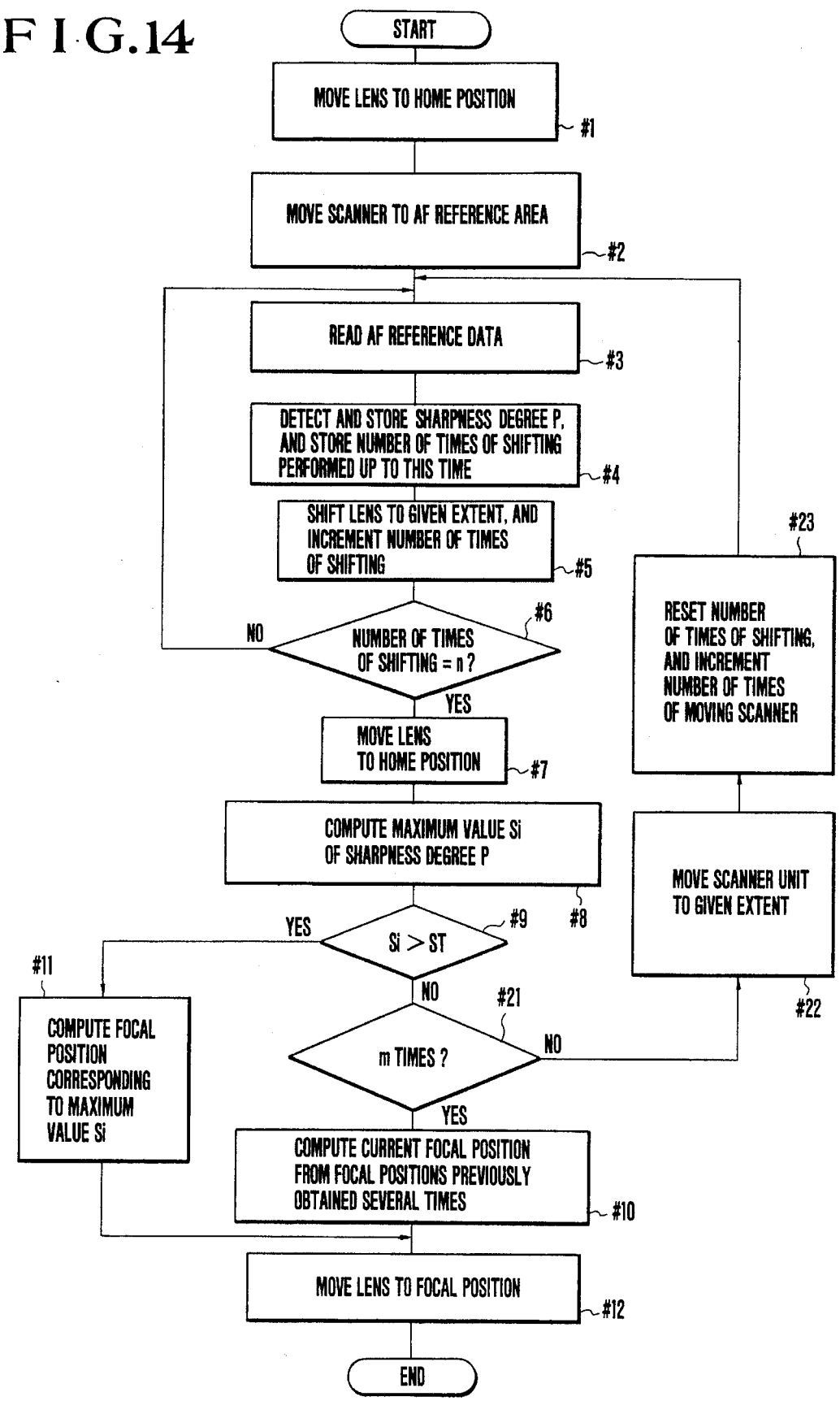
FIG. 14 shows the control algorithm of a further embodiment of the invention.

FIG. 14 shows a third embodiment of the invention. This embodiment employs a control method which is effective in cases where even only one part of the film has the above-stated maximum value Si exceeding the given value ST, with the exception of a case where the maximum value Si is extremely small for the whole film surface.

The third embodiment is arranged as follows: The lens is shifted at steps #1 to #6 in the same manner as in the case of FIG. 11 to obtain the maximum value Si at each lens position for the middle part (the AF reference area) of the screen which is not shown but is attached to the mirror unit 523. Despite of this, if the maximum value Si is found to be not larger than the given value ST at a step #9, the flow of operation comes to steps #21 and #22 to move the scanner unit which includes the Selfoc lens 520 and the sensor 500 to a given extent in the sub-scanning direction by means of the driving circuit 560. At a step #23, the number of times of lens shifting is reset and the number of times m for which the scanner unit is moved is incremented. Then, the above-stated steps #3 to #8 are again executed for areas other than the AF reference area to further look up for the focal position. In this instance, the number of times m for which the scanner unit is moved can be increased, for example, to 10 times or to 20 times to look up a greater number of points in the sub-scanning direction for the focal position. This arrangement permits adequate look-up and control for the point of the maximum value Si, except in a case where the maximum value Si remains small all over the film surface. Further, even in a case where the whole film surface gives small maximum values Si, the AF action can be adequately accomplished by virtue of the focal position control process performed at the step #10.

In brief, the maximum value Si computing action is repeated for predetermined areas of the film surface at the steps #3 to #8 until an area where the maximum value Si exceeds the value ST is found. If this condition is met through these steps #3 to #8, the flow comes to the steps #11 and #12 to move the lens to a position corresponding to the maximum value Si obtained from that area. In cases where no area that meets the condition of Si>ST is found from the whole film surface, i.e., with the detecting action of the steps #3 to #8 repeated m times, the lens is controlled to be moved to a focal position determined on the basis of previously obtained focal positions as mentioned in the foregoing.

Further, each of the focusing processes shown in FIGS. 11, 13(a), 13(b) and 14 is executed for every one of film mounts, that is, for every recording image original immediately before an image recording process.

What is claimed is:

1. An image processing system having an automatic focusing device and arranged to process an optical image of an original formed through an image forming optical system, comprising:

a) a detecting circuit arranged to detect a state of focusing on an instant original;

b) a determining circuit arranged to determine whether or not the state of focusing is detectable by said detecting circuit; and c) a control circuit arranged to operate either (i) in a first mode in which, when the state of focusing is determined by said determining circuit to be detectable, said control circuit causes said image forming optical system to be set in an in-focus position by driving said optical system to a position corresponding to the result of a detection made by said detecting circuit, or (ii) in a second mode in which, when the state of focusing is determined by said determining circuit to be undetectable, said control circuit computes a focal position for said optical system on the basis of in-focus position data set during previous image processing actions performed on preceding originals, and causes said optical system to be set in the computed focal position.

2. A system according to claim 1, wherein said detecting circuit includes a sensor part arranged to receive the optical image of the object and a processing part arranged to find the state of focusing according to an output of said sensor part, and wherein said determining circuit is arranged to determine the state of focusing to be undetectable on the basis of the output of said sensor part when said output fails to show an output state required for detection of the state of focusing.

3. A system according to claim 1, wherein said control circuit is arranged to determine said focal position, in said second mode, on the basis of a plurality of positions of said image forming optical system previously set by previous processing actions.

4. A system according to claim 3, wherein said control circuit is arranged to determine said focal position at an average point of said plurality of set positions.

5. A system according to claim 1, wherein said detecting circuit detects a state of focusing for each of a plurality of predetermined detecting areas of said object by renewing the detecting area from one area to another, wherein said determining circuit is arranged to determine whether the state of focusing is detectable or undetectable for each of said detecting areas, and wherein said control circuit operates, for every detecting area, in said second mode if the state of focusing is determined to be totally undetectable.

6. An image reading system for reading an image of each of a plurality of light-transmission originals by forming the image through an image forming lens on a sensor, comprising:

a) a focus adjusting device arranged to adjust the focus of said image forming lens every time an image reading action is performed on each of said originals, said focus adjusting device comprising:

1) a detecting circuit arranged to detect an imaged state of an instant image, corresponding to an instant original, formed on said sensor by said image forming lens;

2) a determining circuit arranged to determine whether said imaged state is detectable or undetectable by said detecting circuit; and 3) a control circuit arranged to operate either (i) in a first mode in which said control circuit causes said image forming lens to be moved to a position corresponding to the result of detection made by said detecting circuit, when said imaged state is determined by said determining circuit to be detectable, or (ii) in a second mode in which, when said imaged state is determined by said determining circuit to be undetectable, said control circuit computes a focal position based on focusing position data of said lens for previously-read originals, and causes said lens to be moved to the computed focal position.

7. A system according to claim 6, wherein said detecting circuit is arranged to detect an imaged state of each of predetermined parts of the original one after another, and wherein, when said imaged state of any of said predetermined parts is determined by said determining circuit to be undetectable, said lens is moved to the position obtained by said control circuit in said second mode thereof.

8. A system according to claim 6, wherein said detecting circuit is arranged to detect the imaged state of the image by moving said image forming lens, and wherein said control circuit is arranged to cause, in said first mode thereof, said lens to be moved to a position where an optimum imaged state is detected by said detecting circuit.

9. An image reading system for reading an image of each of a plurality of light-transmission originals by forming the image through an image forming lens on a sensor, comprising:

a) a focus adjusting device arranged to adjust the focus of said image forming lens every time an image reading action is performed on each of said originals, said focus adjusting device comprising:

1) a detecting circuit arranged to detect an imaged state of an instant image, corresponding to an instant original, on the basis of an output of said sensor while moving said image forming lens;

2) a determining circuit arranged to determine whether said imaged state is detectable or undetectable by said detecting circuit; and 3) a control circuit arranged to operate either (i) in a first mode in which said control circuit causes said image forming lens to be set in a position where an optimum imaged state is detected by said detecting circuit, when said imaged state is determined by said determining circuit to be detectable, or (ii) in a second mode in which, when said imaged state is determined by said determining circuit to be undetectable, said control circuit computes a lens position on the basis of lens position data previously set by focusing actions performed for previously-read originals, and causes said lens to be moved to the computed position.

10. A system according to claim 9, wherein said control circuit is arranged, in said second mode, to cause said detecting circuit to perform a detecting action on the imaged state of the image by further moving said lens within a predetermined range, after said lens is set in said lens position determined on the basis of said previous lens positions, and to cause said lens to be set in a lens position where an optimum imaged state is detected by said detecting circuit.

11. A system according to claim 9, wherein said detecting circuit is arranged to detect the degree of sharpness of the image on the basis of the output of said sensor part, and wherein said determining circuit is arranged to determine said imaged state to be undetectable when said degree of sharpness is less than a given value.

12. An image reading system for reading an image of each of a plurality of light-transmission originals by forming the image through an image forming lens on a sensor part, comprising:

a) a focus adjusting device arranged to adjust the focus of said image forming lens every time an image reading action is performed on each of said originals, said focus adjusting device comprising:
1) a detecting circuit arranged to detect an imaged state of an instant image, corresponding to an instant original, formed on said sensor by said image forming lens;
2) a determining circuit arranged to determine whether said imaged state is detectable or undetectable by said detecting circuit; and
3) a control circuit arranged to operate either
   (i) in a first mode in which said control circuit causes said image forming lens to be moved to a position corresponding to the result of detection made by said detecting circuit, when said imaged state is determined by said determining circuit to be detectable, or
   (ii) in a second mode in which, when said imaged state is determined by said determining circuit to be undetectable, said control circuit computes a focal position based on data concerning previously-read originals, and causes said lens to be moved to the computed focal position.

13. An automatic focusing device comprising:
a) a detecting circuit arranged to detect a state of focusing on an instant original;
b) a determining circuit arranged to determine whether or not the state of focusing is detectable by said detecting circuit; and
c) a control circuit arranged to operate either
   (i) in a first mode in which, when the state of focusing is determined by said determining circuit to be detectable, said control circuit causes said image forming optical system to be driven to a position corresponding to the result of detection made by said detecting circuit, or
   (ii) in a second mode in which, when the state of focusing is determined by said determining circuit to be undetectable, said control circuit causes said image forming optical system to be driven to a position computed on the basis of the results of a plurality of automatic focusing actions conducted on previous originals.

14. An image reading system for reading an image of each of a plurality of light-transmission originals by forming the image through an image forming lens on a sensor, comprising:
a) a focus adjusting device arranged to adjust the focus of the image through said image forming lens every time an image reading action is performed on each of said originals, said focus adjusting device comprising:
1) a detecting circuit arranged to detect an imaged state of an instant image, corresponding to an instant original, formed on said sensor;
2) a determining circuit arranged to determine whether said imaged state is detectable or undetectable by said detecting circuit; and
3) a control circuit arranged to operate either
   (i) in a first mode in which said control circuit performs a focus adjusting operation based on the result of detection made by said detecting circuit, when said imaged state is determined by said determining circuit to be detectable, or
   (ii) in a second mode in which, when said imaged state is determined by said determining circuit to be undetectable, said control circuit performs a focus adjusting operation in accordance with a computed focal position, the computed focal position being computed based on the results of focus adjustments for previously-read originals.

* * * * *

UNITED STATES PATENT AND TRADEMARK OFFICE
CERTIFICATE OF CORRECTION

PATENT NO. : 5,508,825
DATED : April 16, 1996
INVENTOR(S) : Tatsuhito KATAOKA, et al.

It is certified that error appears in the above-indentified patent and that said Letters Patent is hereby corrected as shown below:

On title page,

ITEM [56] - U.S. PATENT DOCUMENTS:

"4,506,925 2/1985 Hanma et al." should read --4,500,925 2/1985 Hanma et al.--.

SHEET 2 - FIGURE 2:

"POWE-" should read --POWER--.

COLUMN 1:

Line 63, "are" should read --do--.

COLUMN 4:

Line 58, "SYN2" should read --SYNC2--.

COLUMN 7:

Line 4, "formula (b1)" should read --formula (1)--.

COLUMN 8:

Line 49, "block = FFH." should read --black = FFH.--.

UNITED STATES PATENT AND TRADEMARK OFFICE
CERTIFICATE OF CORRECTION

PATENT NO. : 5,508,825         Page 2 of 2
DATED      : April 16, 1996
INVENTOR(S): Tatsuhito KATAOKA, et al.

It is certified that error appears in the above-indentified patent and that said Letters Patent is hereby corrected as shown below:

COLUMN 9:

Line 15, "has" should read --have--; and,
Line 58, "to and" should read --to 95 and--.

COLUMN 12:

Line 24, "of" should be deleted.

Signed and Sealed this

Thirteenth Day of August, 1996

Attest:

BRUCE LEHMAN

*Attesting Officer*   Commissioner of Patents and Trademarks